Jan. 21, 1958 W. H. OSWALD 2,820,542
LIVE CONVEYOR
Filed Sept. 16, 1955
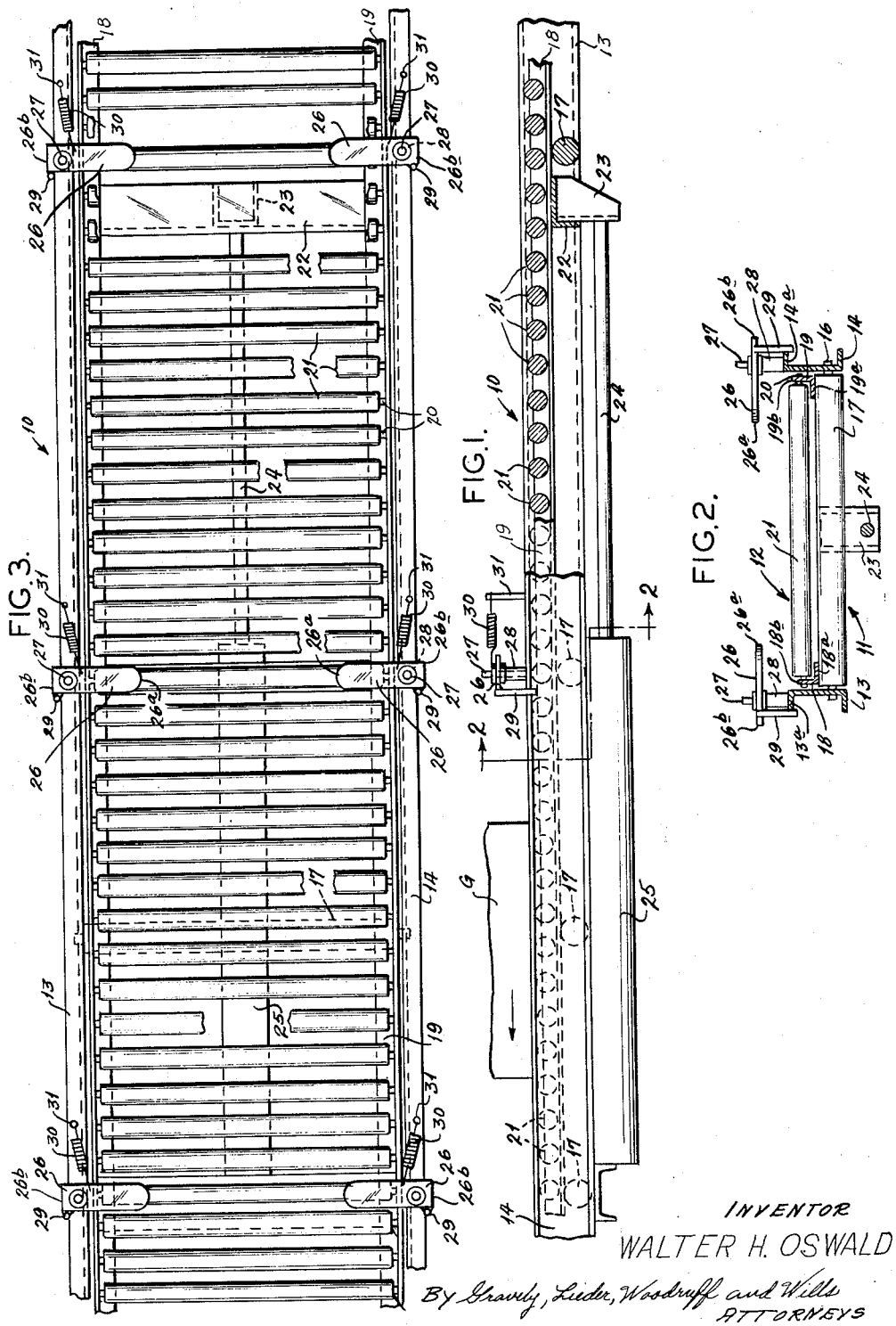
INVENTOR
WALTER H. OSWALD
By Gravely, Lieder, Woodruff and Wills
ATTORNEYS

United States Patent Office 2,820,542
Patented Jan. 21, 1958

2,820,542

LIVE CONVEYOR

Walter H. Oswald, St. Louis, Mo., assignor to Alvey Conveyor Manufacturing Company, St. Louis County, Mo., a corporation of Missouri Application September 16, 1955, Serial No. 534,832

9 Claims. (Cl. 198—218)

The present invention relates generally to live conveyors and particularly to reciprocating conveyor means that develops inertia in the goods being conveyed for advancing the goods along the bed.

It is an object of the present invention, therefore, to provide a live conveyor having a reciprocating bed that develops inertia in the goods for advancement thereof.

Another object of the present invention is to provide a live conveyor that advances goods from station to station along the conveyor bed at periodic intervals.

Another object of the present invention is to provide a live conveyor that advances goods in periodic step by step progress along the conveyor bed and on which bed the goods may be easily retarded without overloading or shutting down the conveyor.

Another object of the invention is to provide a live conveyor suitable for assembly line techniques where varying amounts of time are required for operations on the goods at the stations along the conveyor bed.

A further object of the present invention is to provide a live conveyor that produces a continuous flow of goods.

Further objects and advantages of the present invention will be readily apparent from the detailed description, reference being had to the accompanying drawings wherein preferred embodiments of the invention are shown.

Briefly, the present invention comprises a live conveyor bed including a platform of rotatable elements for supporting the goods, that is adapted to move back and forth on a stationary bed so that the inertia developed in the goods on the forward stroke of the live bed prevents backward movement of the goods by rotating the supporting rolls thereunder during the backward stroke and by further providing yieldable stops that allow movement of the goods in one direction only.

In the drawings:

Fig. 1 is a side elevational view of a portion of a live conveyor constructed according to the teachings of the present invention.

Fig. 2 is a cross-sectional elevational view of the live conveyor shown in Fig. 1 taken along the line 2—2 therein, and Fig. 3 is a top plan view of the portion of the live conveyor of Fig. 1.

Referring to the drawings more particularly by reference numerals, the number 10 refers to a live conveyor constructed according to the present invention. The live conveyor 10 includes a stationary conveyor bed 11 and a movable conveyor bed 12 positioned therein. The stationary bed 11 has two marginal channels 13 and 14 which are connected near their lower edges by transverse shafts 16 which rotatably carry rollers 17. The marginal channels 13 and 14 may be supported in an elevated or other desired position from a floor or ceiling by suitable braces (not shown). The movable or live bed 12 rests on the rotatable elements or rollers 17 and is movable thereon relative to the stationary bed 11.

The movable bed 12 has two parallel angles 18 and 19 which have horizontal walls 18a and 19a which rest on the rollers 17 near the ends thereof and have vertical walls 18b and 19b connected by shafts 20 that rotatably carry rotatable elements or rolls 21. The rolls 21 are closely spaced along the length of the movable bed 12 and provide a movable platform or shelf on which the goods to be conveyed are carried.

An angular shaped brace 22 (Fig. 1) is connected between the marginal angles 18 and 19 on the movable bed 12 by suitable means such as welding. The brace 22 is positioned between two of the spaced rollers 17 in the stationary bed 11 and has a downwardly extending angular member 23 secured thereto. The member 23 is connected at its lower end to a movable piston and rod assembly 24 of a fluid motor 25. The piston and rod assembly 24 moves in both directions in the fluid motor 25 in response to the position of an external valve (not shown) that alternately feeds pressure to both ends of the motor 25. The reciprocating motion of the piston and rod assembly 24 moves the movable bed 12 back and forth relative to the stationary bed 11 on the rollers 17.

Stop elements or dogs 26 are positioned at intervals along the margins of the stationary bed 11. The dogs 26 are shown as flat oblong members having a rounded end 26a for engaging the goods and having the opposite end 26b cornered for limiting the movement thereof as will be described. The dogs 26 are rotatably supported on upstanding shafts or posts 27 secured to upper horizontal surfaces 13a and 14a of the channels 13 and 14 respectively of the stationary bed 11. The upstanding posts 27 extend through vertical bores in studs 28 which are fastened to the under sides of the dogs 26. Also connected to the horizontal portions 13a and 14a of the channels 13 and 14 are dogs stop posts 29 which engage the cornered ends 26b of the dogs 26 for limiting the dogs rotation. The stop posts 29 are positioned so that the dogs 26 can rotate through an angle of approximately 90 degrees from a position in which the dogs 26 are substantially parallel to the channels 13 and 14 to a position in which the dogs 26 are perpendicular thereto. Normally the dogs 26 are biased into the perpendicular position by tension springs 30 which are connected between the dogs 26 and posts 31 supported on the stationary members 13 and 14 as shown in Figs. 1 and 3.

The conveyor 10 operates efficiently when the distance between the stationary rails 13 and 14 is not much greater than the width of the goods being conveyed. When this condition is met the goods operatively engage the dogs 26 on both sides of the bed simultaneously. It is anticipated, however, that goods would only need to engage the dogs 26 on one side of the conveyor 10 in some circumstances.

*Operation*

When goods such as cartons or pallets are conveyed by conveyor 10 they move along from right to left (Figs. 1 and 3) in periodic intervals. The movable bed or frame 12 which supports the goods travels back and forth with the piston and rod assembly 24. When the goods G are being moved from right to left (Figs. 1 and 3) by the leftward stroke of the piston and rod assembly 24, they engage the right sides of the dogs 26 causing the dogs 26 to rotate from the perpendicular or transverse position relative to the beds to a parallel position in opposition to the tension of springs 30. As the movable bed 12 continues to move to the left, the goods G slide past the dogs 26 until the trailing edge of the goods G has cleared the dogs 26. When this occurs the dogs 26 automatically restore to the perpendicular position by operation of the springs 30. By the time the movable bed 12 reaches the left most position the goods G will have stored up a certain amount of inertia due to the motion in that direction, which inertia is usable to advance the goods while the conveyor is being moved to repeat the cycle of events.

It is on the return stroke of the movable bed 12, that inertia stored in the goods causes them to want to continue in the same direction, aided by the rolls 21 acting to rotate beneath them and prevents the goods for returning to the starting point. Toward the end of the return stroke, when the effect of the stored inertia has diminished to zero, the goods begin to move backwards or to the right and engage the left sides of the dogs 26 and are thereby prevented from further movement to the right as the movable bed 12 completes its return stroke. On succeeding strokes of the piston and rod assembly 24 the operation described above is repeated and the goods advance along the conveyor 10 to the left.

The mode of conveying above described has been found particularly suitable for moving loaded pallets and cartons. The conveyor 10 has the advantage in that the goods can easily be retarded or stopped at any place along the bed without interrupting the continuous flow of goods on other portions of the bed or necessitating the shutting down of the conveyor if bottlenecks occur.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What I claim is:

1. A live conveyor comprising a stationary and a movable conveyor bed; said stationary bed including marginal walls defining the edges thereof, a platform of rotatable elements journaled therebetween, and yieldable stop elements mounted on said marginal walls and normally biased transversely relative to said beds; said movable bed being positioned between said marginal walls on the stationary platform of rotatable elements and including a movable conveyor platform having marginal support members and rotatable elements adapted to rotate freely in opposite directions and journaled therebetween for supporting goods to be conveyed, and drive means operatively connected to said movable conveyor bed for movement thereof forwards and backwards relative to the stationary bed and for causing movement of the goods thereon in periodic steps along said beds and into engagement with said yieldable stop elements.

2. The live conveyor of claim 1 in which said yieldable stops are movable between a position in which the stops are transversely disposed relative to the conveyor beds and a position in which the stops are disposed parallel to the conveyor beds in response to movement of the goods relative to the stationary bed into and out of engagement therewith.

3. A live conveyor comprising a stationary and a movable conveyor bed; said stationary bed including parallel marginal walls connected to support means along the edges thereof, a platform between said walls for supporting the movable conveyor bed, and yieldable stop elements mounted on said marginal walls and normally biased to extend from the walls over said conveyor beds; said movable conveyor bed having marginal support members supporting a movable platform of rotatable elements capable of rotating in a forward and rearward direction for supporting goods to be conveyed; and drive means operatively connected to said movable conveyor bed for movement thereof relative to the stationary bed, said movement of the movable conveyor bed moving the goods thereon into and out of engagement with the yieldable stop elements causing said elements to move between a position transverse and a position parallel to the conveyor beds.

4. A live conveyor comprising a stationary and a movable conveyor bed; said stationary bed including a platform of spaced rotatable elements for supporting the movable bed, and yieldable stop elements normally biased to extend over the conveyor beds; said movable conveyor bed having a movable platform of rotatable elements which are capable of rotating in both directions positioned on the stationary bed for supporting goods to be conveyed; and drive means operatively connected to the movable bed for movement thereof back and forth relative to the stationary bed, said movement of the movable bed moving the goods thereon into and out of engagement with the yieldable stop elements causing said elements to move between the normal position extending over the conveyor beds and a position parallel thereto.

5. A live conveyor comprising a stationary and a movable conveyor bed; said stationary bed including parallel walls along the edges thereof, a platform for supporting the movable bed between said walls, and yieldable stop elements mounted on the walls and movable over the conveyor beds through an angle of approximately 90° from a normal biased position extending perpendicular to the conveyor beds to a position substantially parallel thereto; said movable bed including a platform of rotatable elements which are capable of rotating in opposite directions positioned on the stationary bed; and drive means operatively connected to the movable bed for movement thereof back and forth relative to the stationary bed, said movement of the movable bed moving the goods thereon into and out of engagement with the yieldable stop elements causing said elements to move between the perpendicular position over the conveyor beds and the position parallel thereto.

6. The live conveyor of claim 5 wherein said drive means includes a fluid motor having a stationary portion and a movable portion, said movable portion being operatively connected to the movable conveyor bed for movement thereof.

7. A live conveyor comprising an article supporting conveyor bed of rollers arranged to rotate in a forward or rearward direction in response to the motion of articles supported thereon, means operatively supporting said conveyor bed for movement in an article feeding direction to store up inertia forces in the articles being moved with said conveyor bed and for movement in a reverse direction to release the stored inertia forces so that the articles move relative to said conveyor bed in the feeding direction, and means connected to said conveyor bed periodically moving the latter in opposite directions to periodically restore the inertia forces which are effective to advance the articles relative to said conveyor bed.

8. The live conveyor of claim 7 in which the supporting means for the conveyor bed includes movable stop elements engageable by the articles being conveyed and movable in the article feeding direction from a biased position extending over the conveyor bed to a position parallel to the conveyor bed by engagement with the articles moving in the feeding direction only.

9. The live conveyor of claim 8 in which said movable stop elements are limited in movement in the reverse feeding direction to the biased position extending over the conveyor bed.

References Cited in the file of this patent

UNITED STATES PATENTS

| 2,493,465 | Peterson | Jan. 3, 1950 |
| 2,587,690 | Brereton | Mar. 4, 1952 |